United States Patent [19]

Jensen et al.

[11] 4,375,504
[45] Mar. 1, 1983

[54] HYDRODYNAMIC RESERVE BATTERY ACTIVATION SYSTEM

[75] Inventors: Norman E. Jensen, Plymouth; Peter H. Van Sloun, Hopkins, both of Minn.

[73] Assignee: Honeywell Inc., Minneapolis, Minn.

[21] Appl. No.: 260,241

[22] Filed: May 4, 1981

[51] Int. Cl.³ .............................................. H01M 6/30
[52] U.S. Cl. .................................................... 429/115
[58] Field of Search .......................... 429/52, 115, 116

[56] References Cited

U.S. PATENT DOCUMENTS 3,343,993 9/1963 Andersson .......................... 429/115
3,748,183 7/1973 Zaleski ................................ 429/116

Primary Examiner—Donald L. Walton
Attorney, Agent, or Firm—George W. Field

[57] ABSTRACT

A system for activating reserve batteries pyrotechnically, including silicone rubber for conducting the force of detonation from a primer to the ends of the batteries to deform them smoothly and uniformly, and to insulate their casings from metal fragments or combustion products resulting from the detonation.

8 Claims, 2 Drawing Figures

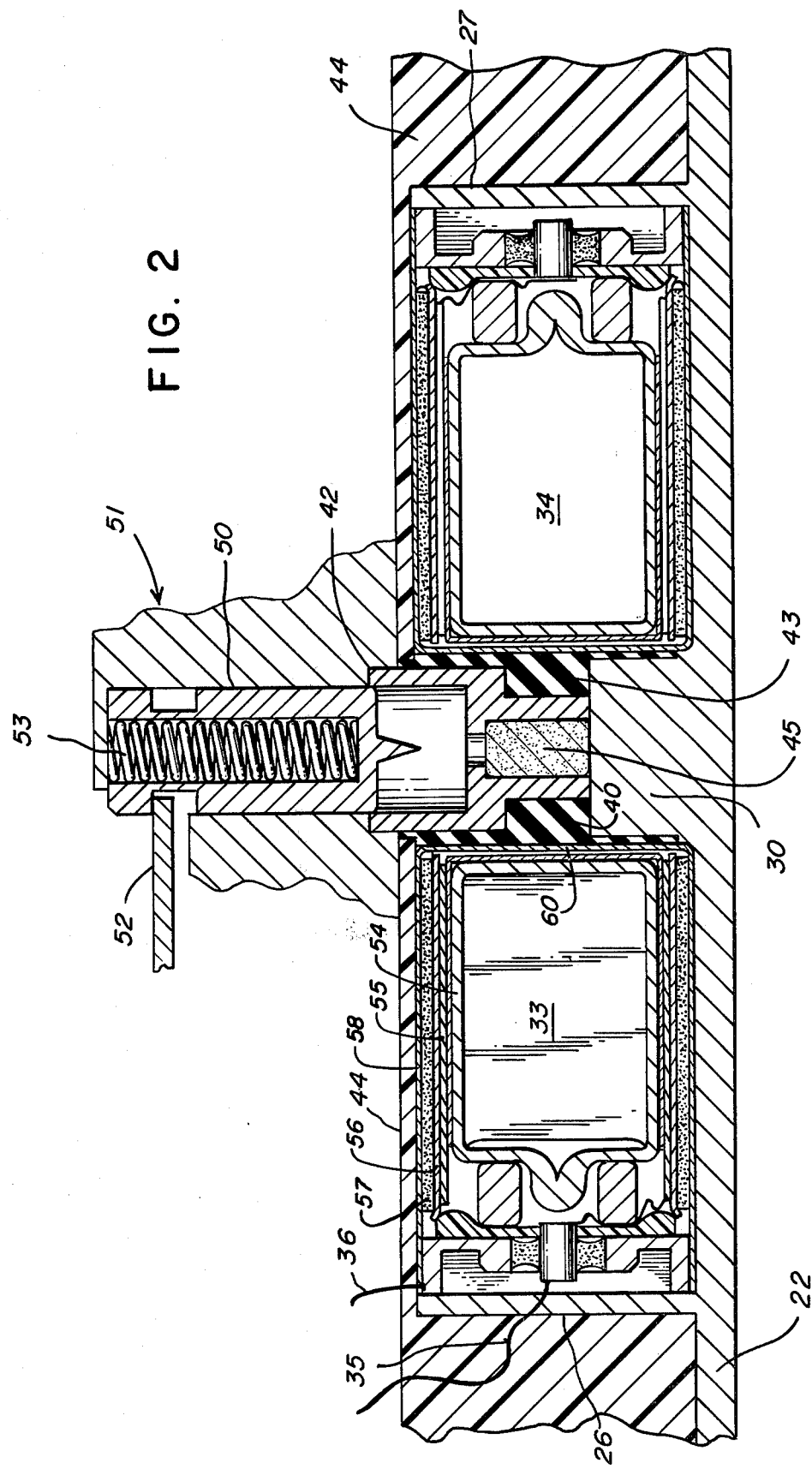

HYDRODYNAMIC RESERVE BATTERY ACTIVATION SYSTEM

The invention herein described was made in the course of or under a contract, or subcontract thereunder, with the U.S. Air Force.

FIELD OF THE INVENTION

This invention relates to the field of electrical engineering, and particularly to apparatus for activating reserve batteries in electrical equipment.

BACKGROUND OF THE INVENTION

Electrical equipment is presently being designed with reserve batteries—that is batteries having electrolyte contained in separate storage, which may be released by fracture of the storage ampule. This fracture is accomplished by deforming the battery casing, in an area devoid of electrodes, and when this is done the electrolyte flows to the electrodes and wets them so that the battery is activated to supply its rated voltage and power.

It is customary to design batteries as small right circular cylinders having first ends which fracture an internal ampule of electrolyte when indented. The other ends of the cylinders include first battery terminals, and the cases comprise the other terminals.

Activation of batteries has been performed mechanically, by mechanism which operates to deform the battery directly, but this method requires rather intricate mechanism, does not provide rapid actuation, and often does not result in complete ampule fracture.

Activation of batteries has also been performed explosively. This method involves a pyrotechnic primer located next to the battery, all held by a structural member such as glass-reinforced nylon. A portion of the structural member separates the primer from the battery. The primer deforms or fractures the structural member to activate the battery. This system is sensitive to dimensional tollerances in the structure member, because that member controls the amount of deformation. The structural member interferes with even pressure distribution, so that deformation of the battery case is not uniform, and closer tolerance is required in the amount of explosive and to preclude the presence of voids and air gaps in the explosive to battery interface: a small battery indentation produces poor ampule fracture and slow activation, and a large indentation can produce battery damage. If the structural member fractures, there is the possibility of unintentional loading of the batteries by metallic primer case remnants or explosive residues.

BRIEF SUMMARY OF THE INVENTION

The present invention comprises an arrangement in which a pyrotechnic primer generates a pressure within a confined area which is transmitted to the batteries through a mass of silicone rubber. The rubber is relatively incompressible and reacts similarly to a hydrodynamic medium to the high velocity pressure input from the primer.

Various advantages and features of novelty which characterize the invention are pointed out with particularity in the claims annexed hereto and forming a part hereof.

However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views, FIG. 2 is a view in section generally along the line 2—2 of FIG. 1, also showing a firing mechanism schematically.

DESCRIPTION OF THE PREFERRED EMBODIMENT

Figure 1:
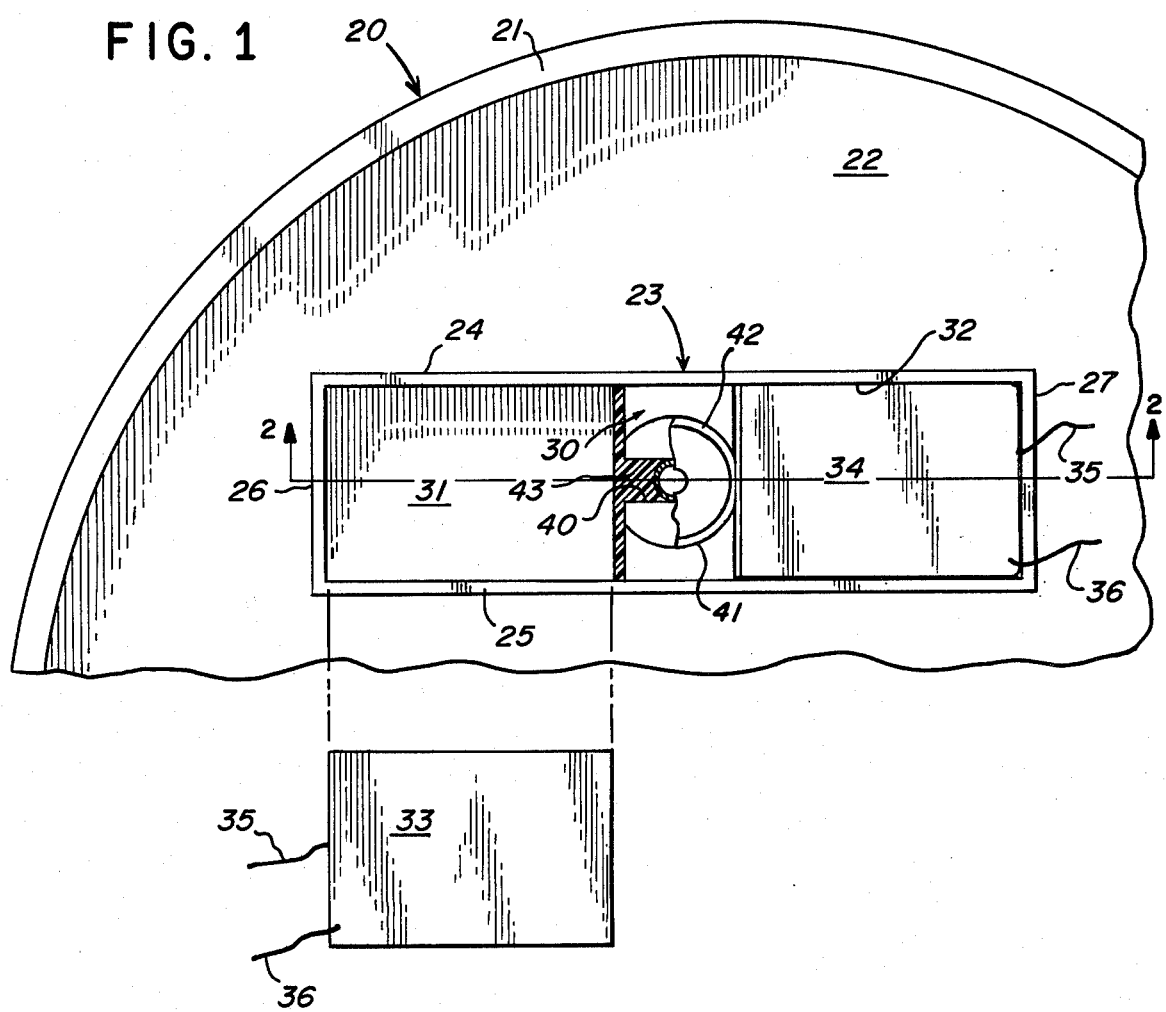
FIG. 1 is a fragmentary plan view of a battery activating system according to the invention before potting, parts being omitted or broken away for clarity of illustration.

The batteries of a system according to the invention are contained in a potting cup 20, comprising a part of a utilization assembly which may include a suitable triggering mechanism. Cup 20 has a circular wall 21 and a body 22 formed to include a battery holder 23 having side walls 24 and 25, end walls 26 and 27, and central boss 30 to define a pair of chambers 31 and 32 sized to receive batteries 33 and 34: battery 34 is shown in place in chamber 32. Electrical conductors 35 and 36 are connected to the central terminal and the outer case of the battery, which comprises the other battery terminal.

Boss 30 has a cross slit 40 and a cylindrical bore 41 to receive a primer holder 42. As is best shown in FIG. 2, the portion of cross slot 40 surrounding holder 42 is filled with silicone rubber 43, which contacts the closed ends of batteries 33 and 34 as well. The whole assembly except the inside of holder 42 is embedded in potting compound 44 from which conductors 35 and 36 extend so that the batteries can be connected in series to a utilization circuit. Note that the battery casings are mutually insulated by silicon rubber 43, potting compound 44, and the material of cup 22.

FIG. 2 shows primer 45 in holder 42. An electrically fired primer could be used, but the figure shows a stab primer for use with a firing pin 50 in a triggering machanism 51 shown schematically to include a latch 52 and a compression spring 53.

For completeness battery 33 is shown to include an ampule 54 containing electrolyte, a first electrode 55, a separator 56, a second battery electrode 57 and an outer casing 58.

When the end 60 of casing 58 is indented, ampule 54 is fractured and the electrolyte may flow to the electrodes to activate the battery.

OPERATION

When installed and potted as described above, batteries 33 and 34 are entirely inactive and have an indefinite shelf life regardless of what utilization circuitry may be connected to conductors 35 and 36. When it is desired to activate the batteries, latch 52 is withdrawn, enabling spring 53 to drive firing pin 50 to pierce primer 45 which detonates, providing a high velocity input through holder 42 to silicone rubber 43. The rubber is relatively incompressible, and is without voids or air pockets, so that it transmits the force equally in all directions in a manner analogous to hydrodynamic media. The battery ends are deformed inwardly at high velocity, causing the ampules to essentially pulverize. The indentations are spherical, with the largest deformation at the center: this gives uniform stress on the casings with minimal deformation at the peripheries where the electrodes are located. The extended smooth indentations of the battery ends give impetus to the electrolytes, forcing them into the electrodes, to wet them, thus producing a short voltage rise time. The silicon rubber also prevents the primer's shattered metal case and explosive by-products from contacting the battery casings.

From the foregoing it will be evident that the invention comprises a system for pyrotechnically activating a pair of reserve batteries by producing smooth uniform inward deformation of the battery ends, without battery damage or chance of short-circuits, the force being conducted in hydrodynamic fashion from the primer to the surfaces to be deformed by silicone rubber.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. In combination:
a member having a wall to be indented;
a housing in which the position of said member is fixed;
a pyrotechnic primer in said housing operable to generate a pressure within a confined volume of space proximate to said wall;
means for initiating operation of said primer;
and means in said housing engaging said wall for conducting pressure generated by said primer to said wall in a hydrodynamic manner.

2. In combination:
a pair of members each having a wall to be indented;
a housing in which said members are fixed with said walls in spaced opposition;
a pyrotechnic primer in said housing operable to generate a pressure within a confined volume of space between said walls;
means for initiating operation of said primer;
and means in said housing engaging said walls for conducting pressure generated by said primer to said walls in a hydrodynamic manner.

3. The combination of claim 1 in which the last name means comprises a confined body of silicon rubber free from air interfaces.

4. The combination of claim 2 in which the last name means comprises a confined body of silicone rubber free from air interfaces.

5. A reserve battery comprising a case containing a plurality of electrodes and a frangible ampule of electrolyte positioned to be fractured by indentation of a wall of said case;
a housing in which the position of said battery is fixed;
a pyrotechnic primer in said housing operable to generate pressure within a confined volume of space proximate to said walls;
means for initiating operation of said primer; and
means in said housing engaging said wall for conducting pressure generated by said primer to said wall in a hydrodynamic manner to indent said wall.

6. A pair of reserve batteries each comprising a case containing a plurality of electrodes and a frangible ampule of electrolyte positioned to be fractured by indentation of a wall of said case;
a housing in which said batteries are fixed with said walls in spaced opposition;
a pyrotechnic primer in said housing operable to generate a pressure within a confined volume of space between said walls;
means for initiating operation of said primer;
and means in said housing engaging said walls for conducting pressure generated by said primer to said walls in a hydrodynamic manner.

7. The combination of claim 5 in which the last named means comprises a confined body of silicone rubber free from air interfaces.

8. The combination of claim 6 in which the last named means comprises a confined body of silicone rubber free from air interfaces.

* * * * *